United States Patent [19]
Seong et al.

[11] Patent Number: 5,687,051
[45] Date of Patent: Nov. 11, 1997

[54] FEEDBACK CIRCUIT FOR PROTECTING AN INTEGRATED CIRCUIT WITH A DELAY TIME

[75] Inventors: Hwan-ho Seong; Sang-hoon Jeong, both of Seoul, Rep. of Korea

[73] Assignee: Samsung Electronics Co., Ltd., Suwon, Rep. of Korea

[21] Appl. No.: 653,058

[22] Filed: May 24, 1996

[30] Foreign Application Priority Data

May 26, 1995 [KR] Rep. of Korea ............... 95-13454

[51] Int. Cl.$^6$ ........................................ H02H 9/02
[52] U.S. Cl. ............................... 361/94; 361/18
[58] Field of Search ........................ 361/18, 54, 56, 361/58, 59, 90, 93, 94, 96, 97, 98, 100, 101, 111; 323/276, 277

[56] References Cited

U.S. PATENT DOCUMENTS 5,224,010  6/1993  Tran et al. ............................ 361/94
5,367,424  11/1994  Even .................................... 361/18

*Primary Examiner*—Jeffrey A. Gaffin
*Assistant Examiner*—Ronald W. Leja
*Attorney, Agent, or Firm*—Cushman Darby & Cushman, IP Group of Pillsbury Madison & Sutro LLP

[57] ABSTRACT

Circuitry is provided which includes a control circuit formed on an integrated circuit. The control circuit controls an operation of a device. The circuitry further includes a feedback circuit and a protection circuit. The feedback circuit includes a first current source for outputting a small current and a second current source for outputting a larger current. A rectifier is connected between an output of the first and second current sources in order to prevent current from flowing from the output of the first current source toward the output of the second current source. A first voltage regulator is connected between an output of the second current source and ground, while a second voltage regulator is connected between the output of the first current source and an input of the protection circuit. A feedback capacitor is connected in parallel with a feedback current sink, between the output of the first current source and ground. The feedback capacitor serves to both activate the protection circuit 300 after a predetermined delay time has elapsed and to time when that predetermined delay time has elapsed.

13 Claims, 3 Drawing Sheets

FEEDBACK CIRCUIT FOR PROTECTING AN INTEGRATED CIRCUIT WITH A DELAY TIME

BACKGROUND OF THE INVENTION

1. Field of the Invention

The present invention relates to a feedback circuit for controlling the protection of an integrated circuit. More particularly, the present invention relates to a feedback circuit coupled to a protection circuit provided to protect an integrated circuit (IC) from a transient phenomenon or a system error.

2. Description of Background Information

FIG. 1 illustrates typical conventional circuitry, including a control circuit 540 formed on an integrated circuit (IC) 550 and a feedback circuit 530. A protection circuit 30 is provided which forms part of feedback circuit 530. The circuitry illustrated in FIG. 1 corresponds to KA 7552 (SAMSUNG).

Control circuit 540 is provided for controlling an operation of a device. More specifically, control circuit 540 controls switching between power supply modes in a device such as a MOSFET. Protection circuit 30 is provided in order to protect control circuit 540 (or the device controlled by control circuit 540) from improper operation or damage due to integrated circuit 550 encountering a transient phenomenon or another type of system error. Feedback circuit 530 is provided to activate protection circuit 30 in response to the current of a transient phenomenon or system error. Feedback circuit 530 activates protection circuit 30 once a predetermined delay time has elapsed since the transient or system error occurred.

Feedback circuit 530 comprises several components which form part of integrated circuit 550. Such components include a first current source 10, a second current source 20; a comparator ZN1, an NPN transistor Q1; and a Zener diode ZN2. An output of second current source 20 is connected to an inverted input of comparator ZN1. An output of comparator ZN1 is connected to a base of NPN transistor Q1. The emitter of NPN transistor Q1 is connected to ground. Zener diode ZN2 has its anode connected to the collector of NPN transistor Q1, and has its cathode connected to an output of first current source 10. Feedback circuit 530 further comprises a timing capacitor $C_T$ which is connected to one of the external pins (i.e., pin #8) of integrated circuit 550. A feedback circuit $C_{FB}$ and a feedback current sink 80 are connected in parallel between one of the external pins (i.e., pin #2), and ground. Pin #8 is connected to the output of first current source 10, and pin #2 is connected to the output of second current source 20.

Control circuit 540 is formed substantially on integrated circuit 550, with the exception of a capacitor G connected to external pin #7 of integrated circuit 550, and comprises an oscillator 60, an undervoltage lock out circuit (UVLO) 70, a current limiting circuit 50, and a pulse amplitude modulation circuit 40. Oscillator (OSC) 60 generates a saw-tooth wave which is input into a non-inverting input of a comparator 41 which forms part of pulse amplitude modulation circuit 40. The output of second current source 20 is connected to an inverting input of comparator 41. In addition to comparator 41, pulse amplitude modulation circuit 40 further comprises a NOR gate 42 and a gate driving circuit 43. NOR gate 42 has one input connected to the output of comparator 41, and has two other inputs, one of which is connected to an output of UVLO 70, and the other of which is connected to an output of current limiting circuit 50. The output of NOR gate 42 is connected directly to an input of gate driving circuit 43. The output of gate driving circuit 43 forms the output of the control circuit 540, which is connected directly to external pin #5 of integrated circuit 550.

The signal formed at output external pin #5 comprises a gate controlling signal for controlling the gate of a transistor which forms part of a device being controlled by the controlling circuit. Pulse amplitude modulation circuit 40 receives a reference voltage (1.9V), a saw-tooth wave output by oscillator 60, and a capacitor voltage charged across capacitor $C_T$ by first current source 10, and modulates an amplitude of the pulse of the input saw-tooth wave. Current limiting circuit 50 restricts or prevents excessive currents in control circuit 540. Under voltage lock-out circuit 70 overrides the operation of control circuit 540 by providing a high level input to NOR gate 42 if the input power voltage being provided to integrated circuit 550 (i.e., Vcc), is less than a predetermined voltage value.

Feedback circuit 530 operates as follows. Feedback current sink 80 receives current from second current source 20, as does feedback capacitor $C_{FB}$. Feedback capacitor $C_{FB}$ charges the current it receives from second current source 20, and, when it reaches a certain voltage value, it causes the output of a comparator ZN1 to become a high value which turns on NPN transistor Q1, thus starting the discharge of timing capacitor $C_T$.

The conventional circuit illustrated in FIG. 1 is designed so that protection circuit 30 is operated when a transient phenomenon or system error is detected, but it is only operated after a predetermined amount of time elapses from the occurrence of the transient phenomenon or system error. This allows the user to assess the situation and to be sure of the effects of the transient phenomenon, or system error, and the actual operation of the circuitry. The conventional circuitry illustrated in FIG. 1, however, is disadvantageous in many respects. Its hardware is complicated in its configuration. Because integrated circuit 550 has so many external pins, it is difficult to employ or assemble within a circuit. In addition, control circuit 540 and its accompanying circuitry take up a considerable amount of space in relation to the overall system within which it is being utilized. Even further, control circuit 540 and its accompanying circuitry are difficult to control.

SUMMARY OF THE INVENTION

In view of the above, the present invention is presented, through one or more of its various aspects, to provide certain objects and advantages such as those noted below.

One object of the present invention is to solve one or more of the above-mentioned problems associated with the conventional circuitry illustrated in FIG. 1.

Another object, more specifically, is to provide a feedback circuit for use in connection with a control circuit formed on an integrated circuit, where the feedback circuit will activate a circuit for protecting the control circuit after a predetermined amount of time has elapsed since the occurrence of a transient phenomenon or a system error.

A further object of the present invention is to provide such feedback circuitry together with control circuitry in the form of an integrated circuit of simple construction, with a reduced number of external pins, without reducing the functions that may be performed by the feedback circuit together with the control circuit.

Accordingly, according to one aspect of the present invention, circuitry is provided which comprises a control circuit formed on an integrated circuit, a feedback circuit, and a protection circuit. The protection circuit may comprise a circuit for overriding operation of the control circuit, by, for example, deactivating the control circuit. The feedback circuit may be provided with, among other elements, a single feedback capacitor which both controls the operation of the protection circuit and is used to control the timing of activation of the protection circuit.

More specifically, as part of the feedback circuit, first and second current sources are provided, the first current source outputting an amount of current which is significantly smaller than that of the second current source. A rectifier is provided having a cathode which is connected to an output of the first current source and an anode connected to an output of the second current source. A first voltage regulator is provided having a cathode connected to the output of the second current source, and an anode connected to ground. The first voltage regulator serves to prevent a voltage higher than a certain first threshold voltage from being formed across the first voltage regulator. A second voltage regulator is provided having a cathode connected to the output of the first current source and an anode connected to an input of the protection circuit. It serves to prevent a voltage higher than a certain second threshold from being formed across the second voltage regulator. The second threshold voltage is higher than the first threshold voltage.

The feedback circuit further includes a feedback capacitor connected between ground and the cathode of the rectifier. The feedback capacitor receives current from both the first and second current sources. If a voltage applied across the feedback capacitor reaches or exceeds a predetermined voltage threshold, the feedback capacitor will begin to slowly charge itself to a value which will cause a current to reach an input of the protection circuit after a predetermined delay time has elapsed.

The feedback circuit may further be provided with a feedback sink connected in parallel with the feedback capacitor, for controlling the amount of current to be charged in the feedback capacitor.

In accordance with a further aspect of the present invention, at least part of the feedback circuit is formed as part of the integrated circuit. More specifically, the feedback circuit may comprise a number of components which form part of the integrated circuit, and at least one external element which is connected to an external pin of the integrated circuit. The at least one external element may comprise the feedback capacitor. The feedback current sink may also be connected externally to the integrated circuit via the same external pin to which the feedback capacitor is connected.

BRIEF DESCRIPTION OF THE DRAWINGS

The present invention will be further described below with reference to the appended drawings, wherein like reference numeral refer to similar parts therein and wherein.

DETAILED DESCRIPTION OF THE EXEMPLARY EMBODIMENT

Figure 1:
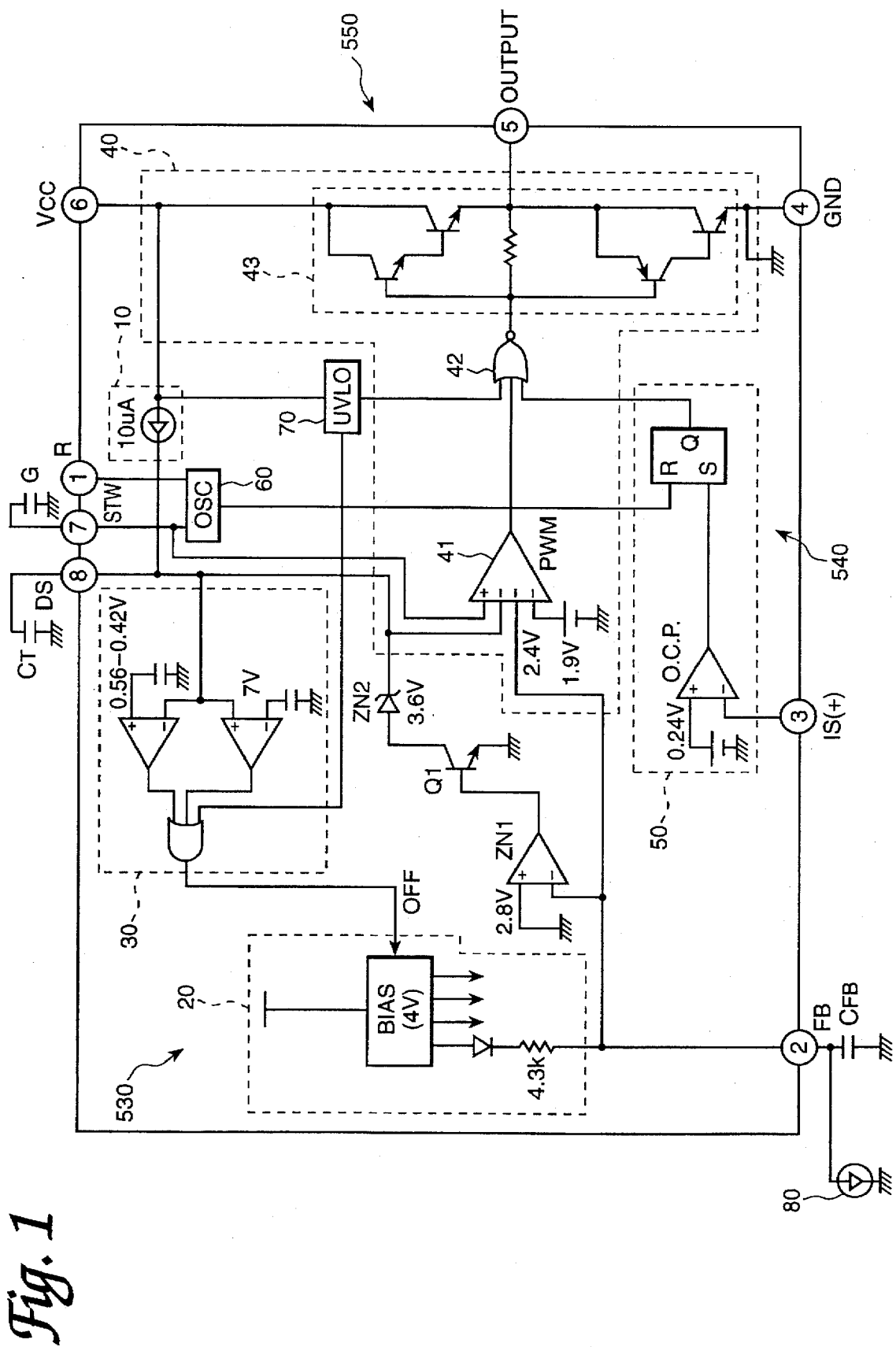
FIG. 1 is a diagram of typical conventional circuitry including a control circuit formed on an integrated circuit, a feedback circuit, and a protection circuit.
Figure 2:
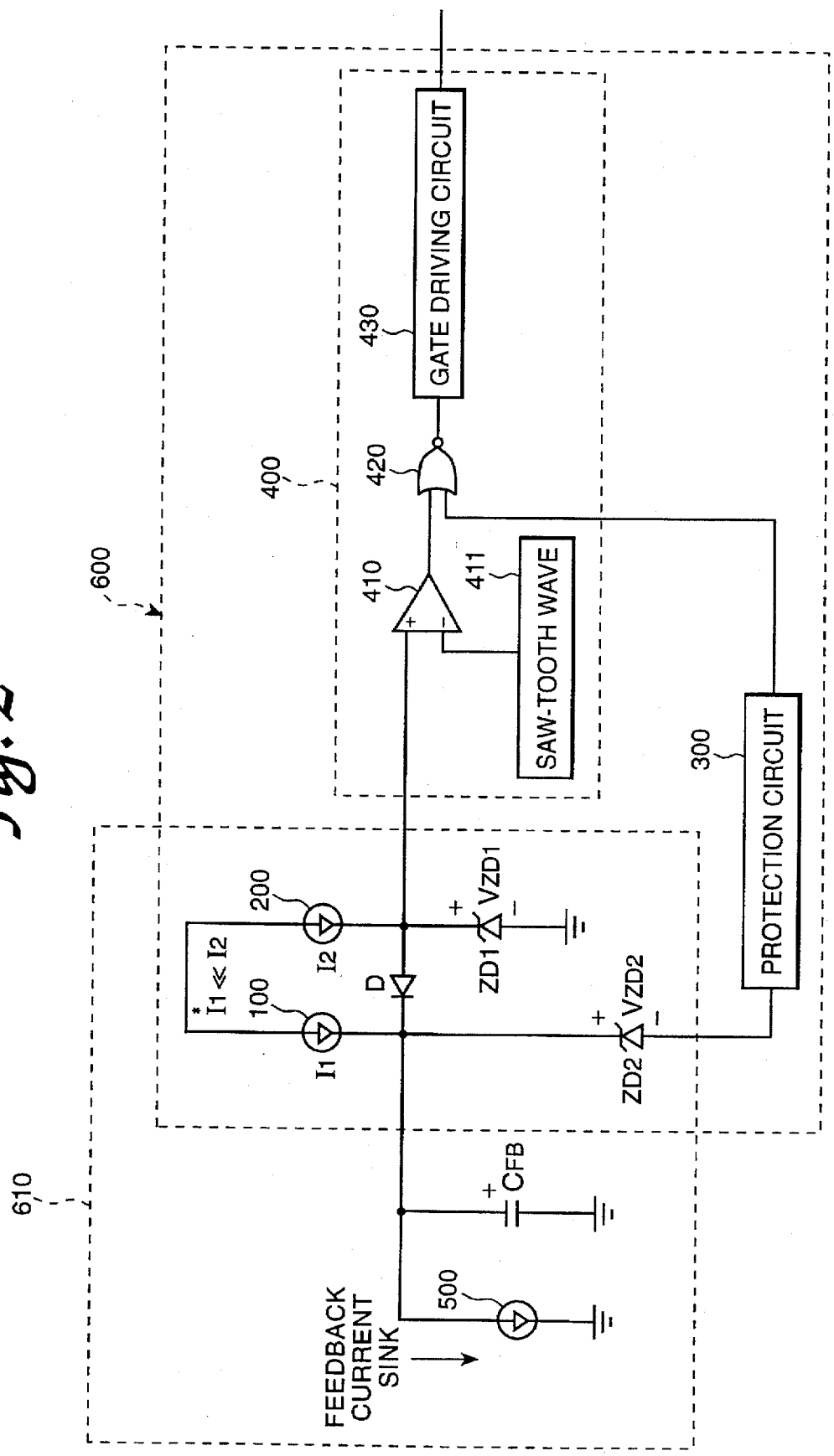
FIG. 2 illustrates an exemplary embodiment of the present invention, including a control circuit, a feedback circuit, and a protection circuit.

Referring now to the drawings in greater detail, FIG. 2 illustrates exemplary circuitry provided in accordance with the present invention. The illustrated circuitry includes a control circuit 400, a feedback circuit 610 and a protection circuit 300. Control circuit 400, protection circuit 300 and a significant portion of feedback circuit 610 are formed on a single integrated circuit 600. Control circuit 400 controls the operation of another device. By way of example, control circuit 400 may control switching between power supply modes in a device such as a MOSFET. Protection circuit 300 is provided in order to protect integrated circuit 600 (or the device controlled by control circuit 400) from improper operation or damage due to the integrated circuit 600 encountering a transient phenomenon or another type of system error. Feedback circuit 610 is provided to activate protection circuit 300 in response to the occurrence of a transient or system error. Feedback circuit 610 activates protection circuit 300 once a predetermined delay time has elapsed since the occurrence of a transient or system error.

Feedback circuit 610 includes a portion which is formed as part of integrated circuit 600, and a portion which is external to integrated circuit 600. The portion of feedback circuit 610 which is part of integrated circuit 600 comprises a first current source 100, a second current source 200, a diode D connected between the respective outputs of the first and second current sources 100, 200, and first and second Zener diodes ZD1 and ZD2. The external part of feedback circuit 610 comprises a feedback capacitor $C_{FB}$ and a feedback current sink 500. First current source 100 outputs a relatively small amount of current, while second current source 200 outputs a considerably larger current than that output by first current source 100.

Diode D comprises a cathode which is connected to an output of first current source 100, and an anode which is connected to an output of second current source 200. Diode D serves to prevent the current from flowing from first current source 100 toward second current source 200. First Zener diode ZD1 comprises a cathode connected to the anode of diode D, and further comprises an anode which is connected to ground. First Zener diode ZD1 serves to prevent a voltage which is higher than a voltage $V_{ZD1}$ from being formed between an output of second current source 200 and ground. Second Zener diode ZD2 comprises a cathode which is connected to the cathode of diode D and comprises an anode which is connected to an input of protection circuit 300. Second Zener diode ZD2 serves to prevent a voltage which is higher than a second threshold voltage $V_{ZD2}$ from being formed between an output of first current source and the input of protection circuit 300.

Protection circuit 300 is connected at its input to the anode of second Zener diode ZD2, and outputs a control signal which is used to protect integrated circuit 600 by shutting off control circuit 400 through activation of a NOR gate 420 provided as part of control circuit 400. This occurs when a predetermined amount of time has elapsed since the occurrence of a transient state or system error.

In the illustrated embodiment, control circuit 400 specifically comprises a pulse amplitude modulation circuit 400, which outputs a signal that may be used to control a gate of a transistor. More specifically, pulse amplitude modulation circuit 400 comprises a comparator 410, a sawtooth wave generator 411, a NOR gate 420 and a gate driving circuit 430. Comparator 410 receives at its non-inverting input a voltage which is formed across first Zener diode ZD1, and a sawtooth wave at its inverting input. NOR gate 420 receives the output of comparator 410 as well as the output of protection circuit 300, and outputs a signal which is used to control gate driving circuit 430. Gate driving circuit 430 outputs a pulse wave includes a modulated version of the input sawtooth wave.

Feedback capacitor $C_{FB}$ is connected between the output of first current source 100 and ground, and charges current received from both first and second current sources, 100, 200. If the voltage formed across feedback capacitor $C_{FB}$ reaches or exceeds the Zener voltage of second Zener diode ZN2, it will activate the protection circuit 300, causing control circuit 400 to be deactivated. Feedback current sink 500 is connected in parallel with feedback capacitor $C_{FB}$, and controls the amount of current to be charged in the feedback capacitor, by receiving current from first and second current sources 100, 200.

The operation of feedback circuit 610 will now be described in further detail. Feedback circuit 610 is designed so that feedback capacitor $C_{FB}$ is charge by only first current source 100, which generates a relatively small amount of current, when feedback circuit 610 is in a transient state or encounters a system error, i.e., when feedback circuit 610 is in an open feedback loop. This causes feedback capacitor to take a certain amount of time before it achieves a certain voltage charge which will cause protection circuit 300 to be activated.

In this case, the delay time may be derived from the following equation:

$$C \cdot \frac{dv}{dt} = i,$$

where C is capacitance, i is current, and v is voltage.

From the above equation, the following equation 1 is derived.

$$\Delta t = \frac{C}{i} \cdot \Delta v \quad (1)$$

This equation states that a preferable delay time can be determined by integrating three variables, i.e., C, i and v.

As shown in FIG. 2, in a normal operation of the feedback loop, the feedback capacitor $C_{FB}$ is charged by combining the current $I_1$ of first current source 100 and $I_2$ of second current source 200. Thus, as shown in FIG. 3, the charged voltage varies from zero to a voltage value equal to the Zener voltage $V_{ZD1}$ of the first Zener diode ZD1 minus the voltage formed across diode D.

Figure 3:
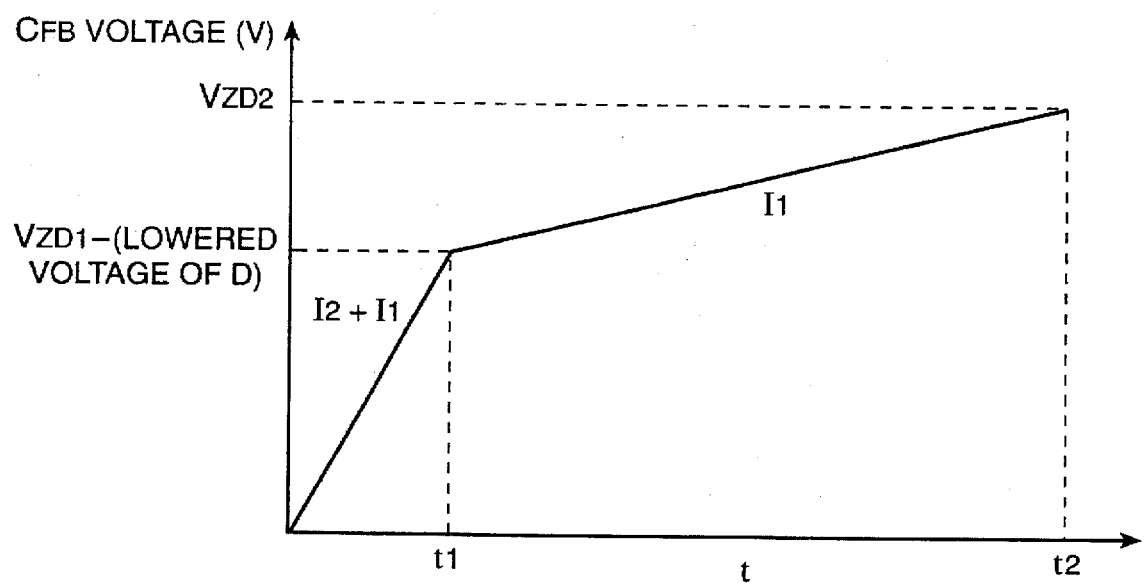
FIG. 3 represents a voltage wave form of a feedback capacitor used in the embodiment illustrated in FIG. 2.

On the other hand, when feedback circuit 610 is in an open-loop, i.e., in case of an overflow or a system error, feedback capacitor $C_{FB}$ is charged by first and second current sources 100 and 200 until time t1, as shown in FIG. 3, since the current sink 500 receives no current. This can be expressed as follows:

$$\text{From } C \cdot \frac{dv}{dt} = i,$$

$$dt = \frac{C}{i} \cdot dv,$$

$$t = \frac{C}{i} \cdot v \quad (2)$$

$$\therefore t = \frac{C_{FB}}{I_2 + I_1} \cdot V_{ZD1} \quad (3)$$

$$\frac{dv}{dt} = \frac{I_2 + I_1}{C_{FB}} \quad (4)$$

As mentioned above, capacitor $C_{FB}$ is charged by combining $I_1$ of first current source 100 and $I_2$ of second current source 200 during the time of Eq. 3 at the rate of Eq. 4.

When the time t1 is reached, i.e., the feedback capacitor $C_{FB}$ has reached a predetermined voltage, second current source 200 is blocked by the diode D and first Zener diode ZD1, and the feedback capacitor $C_{FB}$ is only charged by first current source 100.

Hence, between t1 and t2, where the feedback capacitor $C_{FB}$ is only charged by first current source 100, the charging proceeds at a lower rate than before t1.

Subsequently, if feedback capacitor $C_{FB}$ reaches a voltage higher than the Zener voltage of the second Zener diode, the second Zener diode ZD2 is turned on, and the protection circuit 300 is operated.

Consequently, if feedback capacitor $C_{FB}$ has a voltage higher than the predetermined voltage, the current from second current source 200 is blocked, and feedback capacitor $C_{FB}$ is only charged by first current source 100 thus leading to the lower minimum charge rate dv to dt. Such an operation makes it possible to delay activation of protection circuit 300 until the voltage across feedback capacitor $C_{FB}$ arrives at the second Zener diode voltage $V_{ZD2}$.

Feedback capacitor $C_{FB}$ of the present invention can accordingly perform functions of two separate capacitors, including the timing capacitor $C_T$ (which served as a timer) and the feedback capacitor $C_{FB}$ (which caused the protection circuit to be activated) used in the above-described conventional feedback circuit. Accordingly, while the above-described conventional integrated circuit provided two separate external feedback pins—for the respective capacitors $C_T$ and $C_{FB}$, the present invention's integrated circuit only requires a single external feedback pin—for feedback capacitor $C_{FB}$ and parallel feedback current sink 80.

Since the number of the external pins can be reduced while maintaining the function of the conventional circuitry, the present invention leads to a simple construction and a reduced encumbrance on the space available for the entire system. The present invention may also lead to an easy construction of the integrated circuit and control thereof.

The present invention has been described with reference to a particular exemplary embodiment. The present invention is not intended to be limited to the specific means, structure and steps disclosed in connection with that detailed embodiment. Rather, the present invention is intended to extend to all equivalent means, structure and steps such as are within the scope of the appended claims, in the spirit of the present invention as disclosed herein.

What is claimed is:

1. Circuitry comprising a control circuit formed on an integrated circuit, a feedback circuit, and a protection circuit, said control circuit controlling an operation of a device, said feedback circuit comprising:

a first current source for outputting a first current to a first output;

a second current source for outputting a second current to a second output, having a current value significantly larger than said first current;

a rectifier having a rectifier cathode connected to said first output and a rectifier anode connected to said second output;

a first voltage regulator having a first regulator cathode connected to said second output and a first regulator anode connected to ground, said first voltage regulator preventing a voltage higher than a first threshold voltage from being formed at said second output;

a second voltage regulator having a second regulator cathode connected to said first output and a second regulator anode connected to an input of said protection circuit, and preventing a voltage higher than a second voltage threshold from being formed across said second voltage regulator, said second voltage threshold being higher than said first voltage threshold;

said protection circuit comprising means for outputting a control signal which protects said integrated circuit upon the occurrence of a transient state or system error being encountered by said integrated circuit; and a feedback capacitor connected between ground and said rectifier cathode.

2. The circuitry according to claim 1, further comprising a feedback current sink connected in parallel with said feedback capacitor, for controlling an amount of current to be charged in said feedback capacitor.

3. The circuitry according to claim 1, wherein at least part of said feedback circuit is formed as part of said integrated circuit.

4. The circuitry according to claim 1, wherein said first current source, said second current source, said rectifier, said first voltage regulator, and said second voltage each form part of said integrated circuit wherein said feedback capacitor is connected to an external pin of said integrated circuit.

5. The circuitry according to claim 1, wherein said protection circuit comprising an override circuit for overriding operation of said control circuit.

6. The circuitry according to claim 1, wherein said control circuit comprises a pulse amplitude modulation circuit for outputting a signal used to control a gate of a transistor.

7. The circuitry according to claim 6, wherein said pulse amplitude modulation circuit comprises means for receiving a voltage value which is applied to said first voltage regulator, a sawtooth wave, and a voltage output from said protection circuit, and further comprising means for modulating a pulse amplitude of the said sawtooth wave.

8. The circuitry according to claim 7, wherein said pulse amplitude modulation circuit comprises a comparator for comparing a sawtooth wave to a voltage formed across said first voltage regulator.

9. The circuitry according to claim 8, further comprising:

a NOR gate for receiving a signal output from said comparator and a signal output from said protection circuit; and a gate driving circuit for outputting a driving signal when a signal is output by said NOR gate.

10. The circuitry according to claim 9, wherein said first voltage regulator comprises a Zener diode, and wherein said second voltage regulator comprises a Zener diode.

11. Circuitry comprising a control circuit formed on an integrated circuit, a feedback circuit, and a protection circuit, said control circuit controlling an operation of a device, said feedback circuit comprising:

a first current source for outputting a first current to a first output;

a second current source for outputting a second current to a second output, having a current value significantly larger than said first current;

a capacitor externally connected to said integrated circuit;

a current diverting circuit for charging said capacitor with both said first current and said second current when no transient state or system error is encountered by said integrated circuit, and charging said capacitor with only said first current when a transient or system error is encountered by said integrated circuit.

12. The circuitry according to claim 11, further comprising a switch for enabling said protection circuit when said capacitor reaches a predetermined charged voltage.

13. The circuitry according to claim 12, wherein said current diverting circuit comprises:

a rectifier having a rectifier cathode connected to said first output and a rectifier anode connected to said second output;

a first voltage regulator having a first regulator cathode connected to said second output and a first regulator anode connected to ground, said first voltage regulator preventing a voltage higher than a first threshold voltage from being formed on said second output; and a second voltage regulator having a second regulator cathode connected to said first output and a second regulator anode connected to an input of said protection circuit, said second voltage regulator preventing a voltage higher than a second voltage threshold from being formed across said second voltage regulator, said second voltage threshold being higher than said first voltage threshold.

\* \* \* \* \*